United States Patent
Kumar et al.

(10) Patent No.: US 11,550,029 B2
(45) Date of Patent: Jan. 10, 2023

(54) DELAY CALIBRATION FOR A STEPPED FREQUENCY CONTINUOUS WAVE DIGITAL SIGNAL CHAIN

(71) Applicant: Analog Devices International Unlimited Company, Limerick (IE)

(72) Inventors: Vinoth Kumar, Trichy (IN); Satishchandra G. Rao, Bangalore (IN); Corey Petersen, Poway, CA (US); Madhusudan Rathi, Ratlam (IN); Gerard E. Taylor, Laguna Niguel, CA (US); Kaustubh Mundhada, Bengaluru (IN)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 400 days.

(21) Appl. No.: 16/930,452

(22) Filed: Jul. 16, 2020

(65) Prior Publication Data

US 2022/0018931 A1 Jan. 20, 2022

(51) Int. Cl.
*G01S 7/40* (2006.01)
*G01S 13/32* (2006.01)
*G01S 7/10* (2006.01)

(52) U.S. Cl.
CPC ............ *G01S 7/10* (2013.01); *G01S 13/32* (2013.01)

(58) Field of Classification Search
CPC . G01S 7/40; G01S 13/32; G01S 7/354; G01S 7/4021; G01S 13/38

(Continued)

(56) References Cited

U.S. PATENT DOCUMENTS 9,229,102 B1 * 1/2016 Wright .................. G01S 13/885
9,964,636 B1 * 5/2018 Subramanya ............ G08G 1/09
(Continued)

FOREIGN PATENT DOCUMENTS

EP       1009123 A2 *  6/2000 ........... H04L 1/0045
WO  WO-2019126386 A1 *  6/2019 ........... G01S 13/003

OTHER PUBLICATIONS

Weiss, *Continuous-Wave Stepped-Frequency Radar for Target Ranging and Motion Detection*, Department of Mathematics and Computer Science, South Dakota School of Mines and Technology (SDSM&T), Rapid City, SD, MICS 2009, 11 pages.

(Continued)

*Primary Examiner* — Vladimir Magloire
*Assistant Examiner* — Alexander L. Syrkin
(74) *Attorney, Agent, or Firm* — Akona IP PC

(57) ABSTRACT

Delay calibration for digital signal chains of SFCW systems is disclosed. An example calibration method includes receiving a burst with a test pulse, the burst having a duration of L clock cycles; receiving a trigger indicative of a time when the burst was transmitted; generating a digital signal indicative of the received burst; for each of L clock cycles, computing a moving average of a subset of digital samples and an amplitude for each average; identifying one moving average for which the computed amplitude is closest to an expected amplitude; identifying the clock cycle of the identified moving average; and updating at least one delay to be applied in digital signal processing of received bursts based on a difference between the trigger and the identified clock cycle. The delay may be used for selecting digital samples of the received signal that contain valid data for performing further data processing.

20 Claims, 9 Drawing Sheets

(58) Field of Classification Search
USPC .......................................................... 342/174
See application file for complete search history.

(56) References Cited

U.S. PATENT DOCUMENTS

| | | | |
|---|---|---|---|
| 2007/0104261 A1 | 5/2007 | He et al. | |
| 2008/0228062 A1 | 9/2008 | Zwirn et al. | |
| 2011/0202277 A1* | 8/2011 | Haddad | G01V 3/14 |
| | | | 702/14 |
| 2014/0125509 A1* | 5/2014 | Stolarczyk | H01Q 1/3216 |
| | | | 342/22 |
| 2017/0220752 A1* | 8/2017 | Murphy | A61B 5/02416 |

OTHER PUBLICATIONS

Liu et al., *Method for Compensating Signal Attenuation Using Stepped-Frequency Ground Penetrating Radar*, Sensors 2018, 18, 1366; doi:10.3390/s18051366. www/mdpi.com/journal/sensors, 13 pages.

Nahar, *Design and Implementation of a Stepped Frequency Continuous Wave Radar System for Biomedical Applications*, Masters Theses, University of Tennessee, Knoxville, Aug. 2018, 85 pages.

* cited by examiner

DELAY CALIBRATION FOR A STEPPED FREQUENCY CONTINUOUS WAVE DIGITAL SIGNAL CHAIN

TECHNICAL FIELD OF THE DISCLOSURE

The present disclosure generally relates to electronic devices and systems and, more particularly, to stepped frequency continuous wave (SFCW) systems.

BACKGROUND

SFCW is a technology where the waves are transmitted in bursts of pulses. One characteristic feature of a SFCW system is that the frequency is increased linearly in discrete steps for successive pulse transmission. Modulation occurs across pulses of different bursts instead of within each pulse. FIG. 1 provides an example illustration of a signal 100 that may be used in a SFCW system. As shown in FIG. 1, the SFCW signal 100 includes 5 successive bursts 102 (labeled as bursts 102-1 through 102-5), each burst having a pulse 104 (labeled as pulses 104-1 through 104-5) of a different frequency (a given frequency may be referred to as a "tone"), typically in the radio frequency (RF) range.

SFCW is an emerging technology in millimeter-wave imaging radar applications with multiple advantages like deeper material penetration, higher average power, low turnaround time and higher precision with signal processing. For example, one imaging application may involve a multi-transmit multi-receive SFCW system where one or more transmitters transmit SFCW pulses one after another. When more transmitters transmit together in the same time slot, they may use different frequencies for their pulses. The reflected pulses are captured by a receiver that processes the reflected pulses to determine their amplitude and/or phase in order to produce an image of and/or determine various characteristics of an object from which the pulses were reflected further. Such a SFCW system may be used in a body scanner or other medical imaging applications, for example.

Determining amplitude and phase of received signals is a common task in various RF systems, where a large portion of data processing is performed in the digital domain (i.e., one received signals have been converted from the analog form to the digital form). However, the bursting nature of pulses in SFCW systems impose digital signal processing (DSP) challenges that are not present in other RF systems. One such challenge resides in selecting digital samples of the received signal that contain valid data for performing further data processing on, e.g., for computing moving averages from, where the moving averages may then be used for determining the amplitudes and phases of the reflected signals. For example, consider an example shown in FIG. 2, providing a time domain representation of a clock signal, time slots, and valid/invalid samples regions. In FIG. 2, 202 illustrates a clock signal used for a mixer configured to perform downconversion of digital samples of a reflected signal from an RF or intermediate frequency (IF) to baseband (i.e., DC or zero-frequency signal), for an oscillator configured to provide an oscillator signal to the mixer for performing the frequency downconversion, and for a moving averager (i.e., a unit configured to compute moving averages of the samples of the DC signal). Furthermore, 204 illustrates in FIG. 2 different time slots in which pulses are transmitted (shown as a time slot 1 and a time slot 2), and 206 illustrates regions of valid digital samples and invalid digital samples, for the time slots 204 and the clock signal 202 shown in this drawing. As described above, transmission of different bursts happens in successive time slots. The example shown in FIG. 2 illustrates that a single burst may having the time duration of L clock pulses (i.e., each of the time slot 1 and the time slot 2 shown in FIG. 2 may have the duration of L clock pulses, where FIG. 2 illustrates an example where L=36, but in other embodiments the value of L may be different), out of which digital data from a range 212 may be considered to be invalid data (e.g., invalid due to transmitter switch, settling time, channel effects, etc.), while data from a range 214 may be considered to be valid data based on which further digital processing may be performed. As shown in FIG. 2, in some implementations, the time slot 1 may have a region (i.e., a time period) 212-1 of invalid samples and a region 214-1 of valid samples, and the time slot 2 may have a region 212-2 of invalid samples and a region 214-2 of valid samples. The time slots 1 and 2 shown in the illustration of FIG. 2 may be the time slots associated with the bursts 102 as explained with reference to FIG. 1, i.e., the burst 102-1 may include the region 212-1 of invalid samples followed by the region 214-1 (the latter at least partially overlapping with the pulse 104-1 of the burst 102-1), the burst 102-2 may include the region 212-2 of invalid samples followed by the region 214-2 (the latter at least partially overlapping with the pulse 104-2 of the burst 102-2), and so on. A moving average for the burst 102-1 may then be computed based on at least a subset of the digital samples in the time period of the region 214-1, a moving average for the burst 102-2 may then be computed based on at least a subset of the digital samples in the time period of the region 214-2, and so on.

Selecting digital samples of the received signal that contain valid data for performing further data processing (e.g., moving average calculations) refers to determining the point in time when the region 214 begins, in each of the time slots 204 (i.e., for each of the bursts). Although transmitters typically provide indications (referred to in the following as a "trigger") of the times when transmission of SFCW signals starts (e.g., indicating the time when the region 212 begins), determining when the region 214 begins is not an easy task because various factors within a SFCW system, such as process/voltage/temperature (PVT) variations, transmitter switches, and channel effects may affect the delay between the time when transmission of a new burst has begun and the time when the region 214 begins. Thus, a variety of factors can affect the quality, robustness, and cost of precise data capture in a SFCW digital signal chain. Physical constraints such as space/surface area can pose further constraints to requirements or specifications of data capture in a SFCW digital signal chain, and thus trade-off and ingenuity have to be exercised in designing a data capture arrangement in a SFCW digital signal chain that is optimal for a given application.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
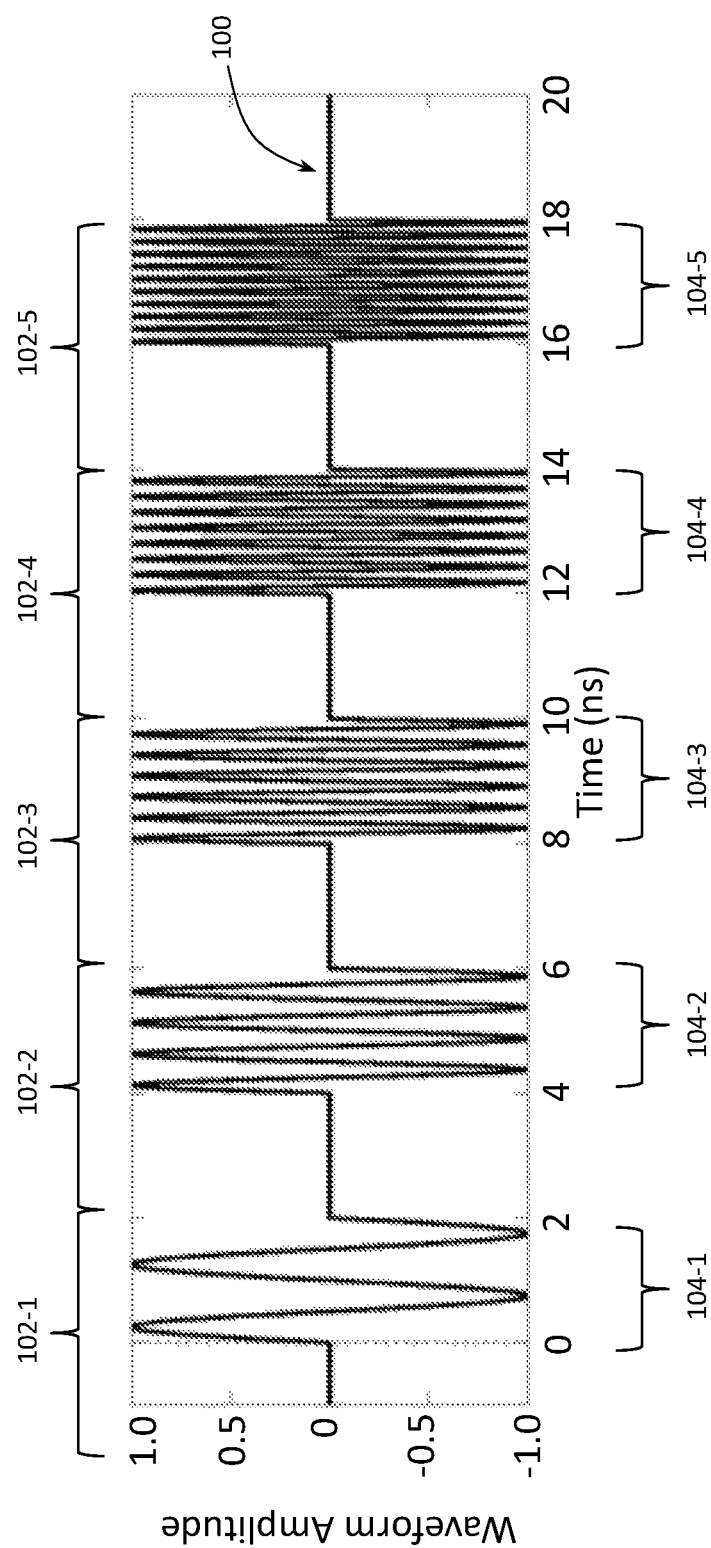
FIG. 1 provides an example illustration of a SFCW signal, according to some embodiments of the present disclosure.
Figure 2:
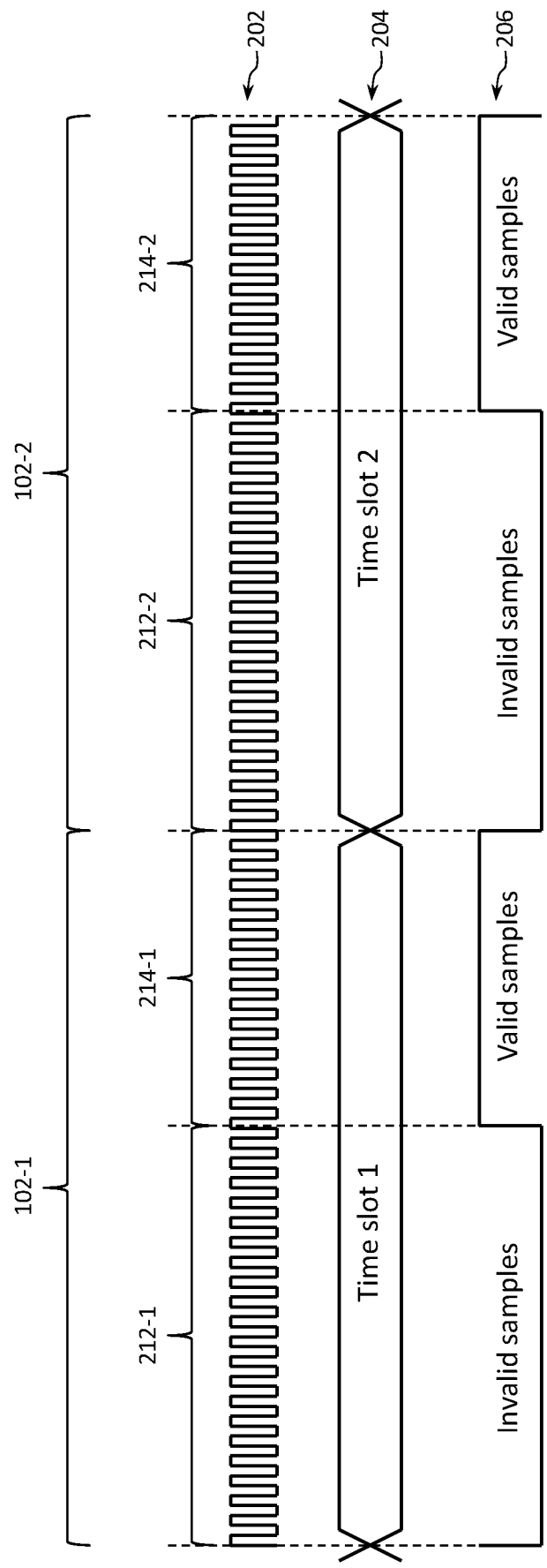
FIG. 2 provides a time domain representation of a clock signal, time slots, and valid/invalid samples regions for a SFCW signal, according to some embodiments of the present disclosure.

The systems, methods and devices of this disclosure each have several innovative aspects, no single one of which is solely responsible for all of the desirable attributes disclosed herein. Details of one or more implementations of the subject matter described in the present disclosure are set forth in the description below and the accompanying drawings.

Embodiments of the present disclosure relate to methods and systems for implementing delay calibration for digital signal chains of SFCW systems. As used herein, the term "delay calibration" refers to carrying out a process to determine the delay between the time when transmission of a new burst begins (e.g., the time when the region 212 begins) and the time when digital data samples that are suitable for further data processing begin (e.g., the time when the region 214 begins). An example calibration method includes receiving a burst with a test pulse, the burst having a duration of L clock cycles; receiving a trigger indicative of a time when the burst was transmitted; generating a digital signal indicative of the received burst; for each of L clock cycles, computing a moving average of a subset of digital samples and an amplitude for each average; identifying one moving average for which the computed amplitude is closest to an expected amplitude; identifying the clock cycle of the identified moving average; and updating at least one delay to be applied in digital signal processing of received bursts based on a difference between the trigger and the identified clock cycle. The at least one delay updated in this manner may then be used for selecting digital samples of the received signal that contain valid data for performing further data processing (e.g., moving average calculations). Such a calibration method may be performed every time a SFCW system starts up, periodically, or at any other points in time as desired, to enable compensation for one or more PVT variations, transmitter switches, channel effects, and any other phenomena that may affect the delay between the time when transmission of a new burst has begun and the time when digital data samples that are suitable for further data processing begin.

As will be appreciated by one skilled in the art, aspects of the present disclosure, in particular aspects of delay calibration for a SFCW digital signal chain as proposed herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g., to the existing SFCW receivers and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the select examples.

In the following description, reference is made to the drawings, where like reference numerals can indicate identical or functionally similar elements. It will be understood that elements illustrated in the drawings are not necessarily drawn to scale. Moreover, some embodiments can incorporate any suitable combination of features from two or more drawings. Further, it will be understood that certain embodiments can include more elements than illustrated in a drawing and/or a subset of the elements illustrated in a drawing. In general, while some drawings provided herein illustrate various aspects of delay calibration for a SFCW digital signal chain, and systems in which such circuits may be implemented, details of these systems may be different in different embodiments. For example, various components of systems for performing and using delay calibration for a SFCW digital signal chain, presented herein, may have further components included therein, or coupled thereto, which are not specifically shown in the drawings, such as logic, storage, passive elements (e.g., resistors, capacitors, inductors, etc.), or other elements (e.g., transistors, etc.). In another example, details shown in some of the drawings, such as the particular arrangement and example implementation details of various components of systems for performing and using delay calibration for a SFCW digital signal chain presented herein (e.g., downconverters, moving averagers, etc.) and/or the particular arrangement of coupling connections (e.g., coupling connections between the outputs of various stages of systems for performing and using delay calibration for a SFCW digital signal chain as described herein) may be different in different embodiments, with the illustrations of the present drawings providing only some examples of how these components may be used together to realize delay calibration for a SFCW digital chain. In yet another example, although some embodiments shown in the present drawings illustrate a certain number of components (e.g., a certain number of channels of a SFCW system, a certain number of tones in a SFCW signal, or a certain number of clock cycles in each burst), it is understood that these embodiments may be implemented in a SFCW system with any number of these components in accordance with the descriptions provided herein. Furthermore, although certain components may be depicted in the drawings as communicatively coupled using a single line, in some embodiments, any of these components may be coupled by a plurality of conductive lines such as those that may be present in a bus, or when differential signals are involved.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Furthermore, for the purposes of the present disclosure, the phrase "A and/or B" or notation "A/B" means (A), (B), or (A and B), while the phrase "A, B, and/or C" means (A), (B), (C), (A and B), (A and C), (B and C), or (A, B, and C). As used herein, the notation "A/B/C" means (A, B, and/or C). The term "between," when used with reference to measurement ranges, is inclusive of the ends of the measurement ranges.

Various aspects of the illustrative embodiments are described using terms commonly employed by those skilled in the art to convey the substance of their work to others skilled in the art. For example, the term "connected" means a direct electrical connection between the things that are connected, without any intermediary devices/components, while the term "coupled" means either a direct electrical connection between the things that are connected, or an indirect electrical connection through one or more passive or active intermediary devices/components. In another example, the terms "circuit" or "circuitry" (which may be used interchangeably) refer to one or more passive and/or active components that are arranged to cooperate with one another to provide a desired function. Sometimes, in the present descriptions, the term "circuit" may be omitted (e.g., a moving averager circuit may be referred to simply as a "moving averager," etc.). If used, the terms "substantially," "approximately," "about," etc., may be used to generally refer to being within +/−20% of a target value, e.g., within +/−10% of a target value, based on the context of a particular value as described herein or as known in the art.

Example SFCW System

Figure 3:
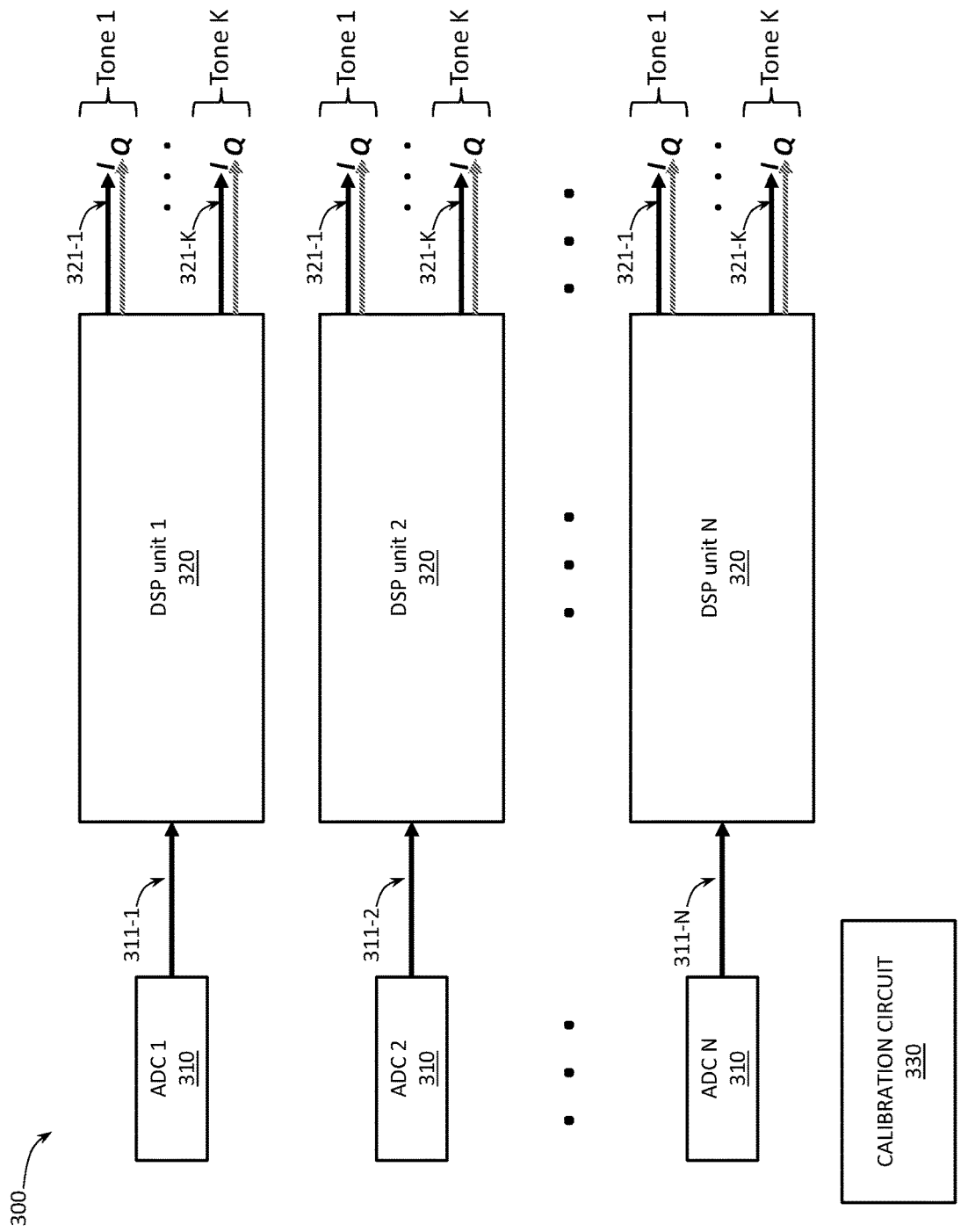
FIG. 3 provides a schematic illustration of a SFCW system with quadrature processing for N channels and K tones per channel, according to some embodiments of the present disclosure.

FIG. 3 provides a schematic illustration of a SFCW system 300, in particular, a SFCW receiver, with quadrature processing for N channels and K tones per channel, according to some embodiments of the present disclosure. As shown in FIG. 3, the SFCW system 300 may include one or more, typically a plurality of, ADCs 310. FIG. 3 illustrates the ADCs 310 as ADC 1, ADC 2, and so on, until ADC N, to illustrate N ADCs 310, where N is an integer equal to or greater than 1. Each ADC 310 may be associated with a respective DSP unit 320 coupled to the ADC 310 in a one-to-one correspondence. FIG. 3 illustrates the DSP units 320 as DSP unit 1, DSP unit 2, and so on, until DSP unit N, each DSP unit 320 coupled to a different one of the ADCs 310 and vice versa. A given ADC 310 together with a corresponding DSP unit 320 coupled thereto may be seen as a channel of the SFCW system 300. Thus, the SFCW system 300 shown in FIG. 3 includes N channels. The ADCs 310 are configured to receive SFCW signals, where each SFCW signal includes a sequence of K consecutive bursts (e.g., as shown in FIG. 1 for the example of K being equal to 5), where K may be any integer greater than 1, each one of the K bursts including a pulse such that the frequency is increased linearly in discrete steps for successive pulse transmission (i.e., for the pulses of successive bursts of a given SFCW signal). Thus, each SFCW signal contains signal components with K different frequencies/tones. The ADCs 310 are configured to digitize the received SFCW signals and provide their outputs 311 (i.e., digital signals indicative of the received SFCW signals) to the respective DSP units 320. Thus, the DSP unit 1 is configured to receive as an input a signal indicative of the output 311-1 of the ADC 1, the DSP unit 2 is configured to receive as an input a signal indicative of the output 311-2 of the ADC 2, and so on, until the DSP unit N that is configured to receive as an input a signal indicative of the output 311-N of the ADC N. The respective DSP units 320 are configured to perform digital data processing and provide separate outputs for each of the K different frequencies/tones of the received SFCW signals, as is depicted in FIG. 3 with different outputs 321 of each DSP unit 320 labeled as Tone 1 (output 321-1), and so on, until Tone K (output 321-K). In some embodiments, the DSP units 320 may be configured to perform quadrature processing, in which case for each of the K tones each of the DSP units 320 generates two outputs 321, one for the I-component and the other one for the Q-component of the output signal. Thus, the SFCW system 300 may be configured to receive N inputs (one input for each of the N ADCs 310) and generate N*K*2 outputs 321 (N channels, K outputs 321 per channel, 2 output components per each of the K outputs 321 per channel).

Not specifically shown in FIG. 3 is that, in some embodiments, the outputs 321 of the DSP units 320 may be coupled to an interface, e.g., JESD interface, and may be transmitted in parallel to a baseband circuit (also not shown in FIG. 3) for further processing. Also not specifically shown in FIG. 3 are antennas for receiving wirelessly transmitted SFCW signals, RF circuitry for processing the received SFCW signals in analog domain (e.g., circuitry for performing a downconversion of the received SFCW signals from RF frequencies to lower frequencies, e.g., to one or more intermediate frequencies (IFs)).

As is further shown in FIG. 3, the SFCW system 300 may include a calibration circuit 330, which may either be included within the SFCW system 300 or be communicatively coupled to the SFCW system 300. The calibration circuit 330 may be implemented as a controller, configured to control various aspects of performing delay calibration for a digital signal chain of the SFCW system 300. As used herein, the term "digital signal chain" may refer to any signal processing in the digital domain, i.e., in the domain after the ADCs 310 converted analog signals to digital signals.

Figure 4:
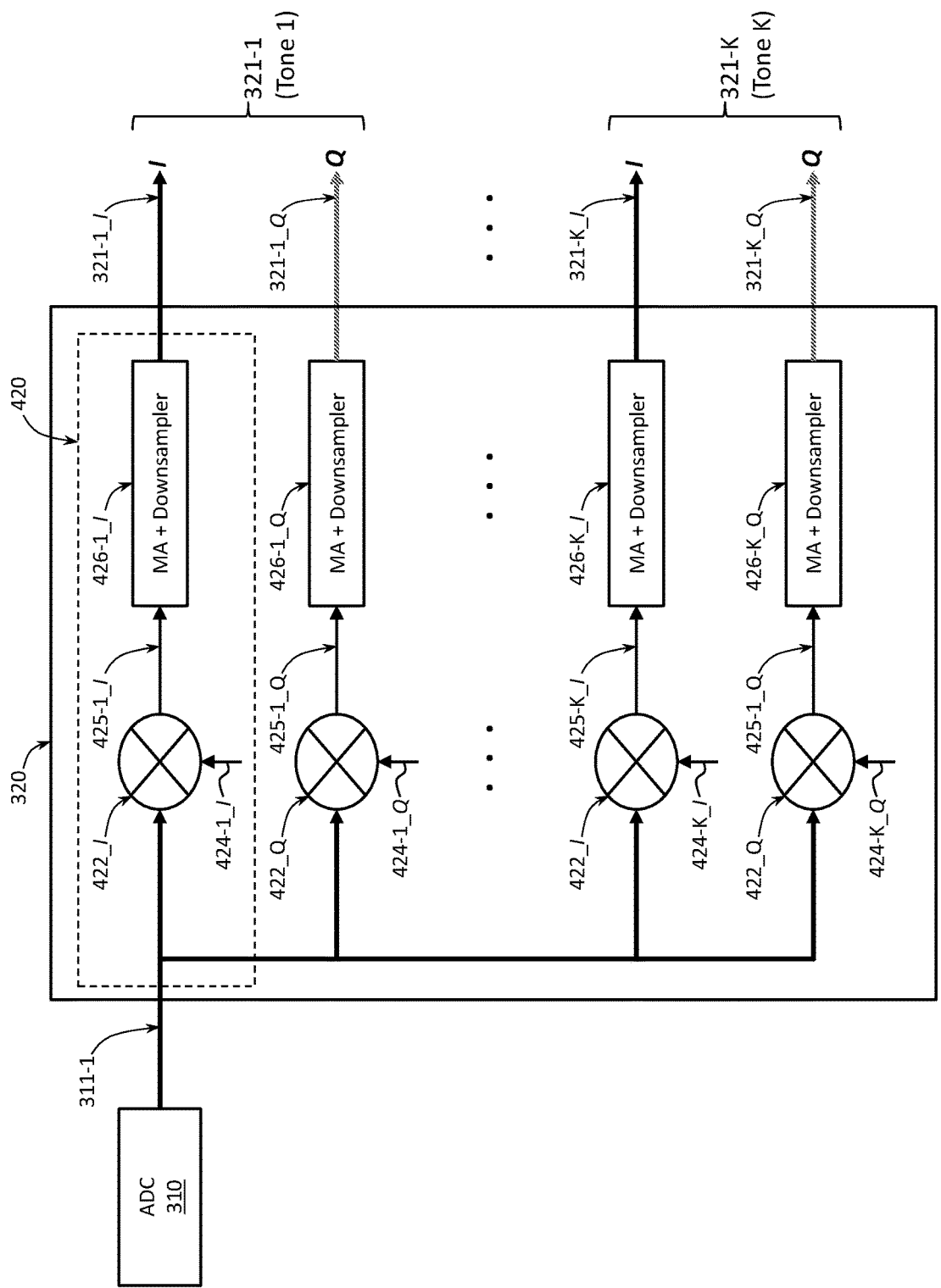
FIG. 4 provides a schematic illustration of a portion of the DSP unit associated with one of the ADCs of the SFCW system shown in FIG. 3, according to some embodiments of the present disclosure.

FIG. 4 provides a schematic illustration of a portion of one of the DSP units 320 associated with one of the ADCs 310 of the SFCW system 300 shown in FIG. 3, e.g., of the DSP unit 1 configured to receive the input signal 311-1, according to some embodiments of the present disclosure. As shown, the DSP unit 320 may be configured to perform quadrature processing in that it may include a pair of quadrature mixers, shown in FIG. 4 as a first mixer 422_I and a second mixer 422_Q, for each of the K tones of the digitized SFCW signal 311-1 indicative of the output generated by the corresponding one of the ADCs 310 (i.e., by the ADC 1, for the example of the DSP unit 1 shown in FIG. 4). Each of the first and second mixers 422_1 and 422_Q for each of the K tones is configured to receive the same input signal 311-1 as their first input, but they differ in which oscillator signal they receive as their second input in order to perform their respective frequency mixing. For the first tone of the K tones, the first mixer 422_I is configured to generate an in-phase (I) downconverted receive (RX) signal 425-1_I by mixing the RX signal 311-1 and an in-phase component 424-1_I of an oscillator (e.g., a local oscillator (LO)) signal 424-1 for tone 1 (i.e., cos(LO), labeled in FIG. 4 at the second input to the first mixer 422_I of the pair of mixers for tone 1), while the second mixer 422_Q is configured to generate a quadrature phase (Q) downconverted RX signal 425-1_Q by mixing the RX signal 311-1 and a quadrature component 424-1_Q. of the oscillator signal 424-1 (i.e., sin(LO), which is a component that is offset in phase from the in-phase component of the oscillator signal 424-1 by 90 degrees, labeled in FIG. 4 at the second input to the second mixer 422_Q of the pair of mixers for tone 1). The output 425-1_I of the first mixer 422_I for tone 1 may be provided to an I-signal path for tone 1 that may include at least a moving averager 426-1_I (which may also be configured to perform downsampling), configured to compute moving averages based on the input provided thereto (i.e., based on the signal 425-1_I) to generate the in-phase component 321-1_I of the output 321-1. The output 425-1_Q. of the second mixer 422_Q for tone 1 may be provided to a Q-signal path for tone 1 that may include at least a moving averager 426-1_Q (which may also be configured to perform downsampling), configured to compute moving averages based on the input provided thereto (i.e., based on the signal 425-1_Q) to generate the quadrature component 321-1_Q of the output 321-1. The quadrature component 321-1_Q may be substantially 90 degrees out of phase with the I-signal path component 321-1_I. Analogous pairs of first and second mixers may be used for all other tones, as is shown in FIG. 4, except that the first and second mixers of different tones are configured to receive in-phase and quadrature components of signals of different frequencies, depending on the tone, in order to perform frequency downconversion to generate a substantially DC output from each mixer. For the last one of the K tones, the first mixer 422_1 is configured to generate an in-phase downconverted RX signal 425-K_I by mixing the RX signal 311-1 and an in-phase component 424-K_I of an signal 424-K for tone K (i.e., cos(LO), labeled in FIG. 4 at the second input to the first mixer 422_I of the pair of mixers for Tone K), while the second mixer 422_Q is configured to generate a quadrature downconverted RX signal 425-K_Q by mixing the RX signal 311-K and a quadrature component 424-K_Q of the oscillator signal 424-K (i.e., sin(LO), which is a component that is offset in phase from the in-phase component of the oscillator signal 424-K by 90 degrees, labeled in FIG. 4 at the second input to the second mixer 422_Q of the pair of mixers for tone K). The output 425-K_I of the first mixer 422_I for tone K may be provided to an I-signal path for tone K that may include at least a moving averager 426-K_I (which may also be configured to perform downsampling), configured to compute moving averages based on the input provided thereto (i.e., based on the signal 425-K_I) to generate the in-phase component 321-K_I of the output 321-K. The output 425-K_Q of the second mixer 422_Q for tone K may be provided to a Q-signal path for tone K that may include at least a moving averager 426-K_Q (which may also be configured to perform downsampling), configured to compute moving averages based on the input provided thereto (i.e., based on the signal 425-K_Q) to generate the quadrature component 321-K_Q of the output 321-K. The quadrature component 321-K_Q may be substantially 90 degrees out of phase with the I-signal path component 321-K_I.

Figure 5:
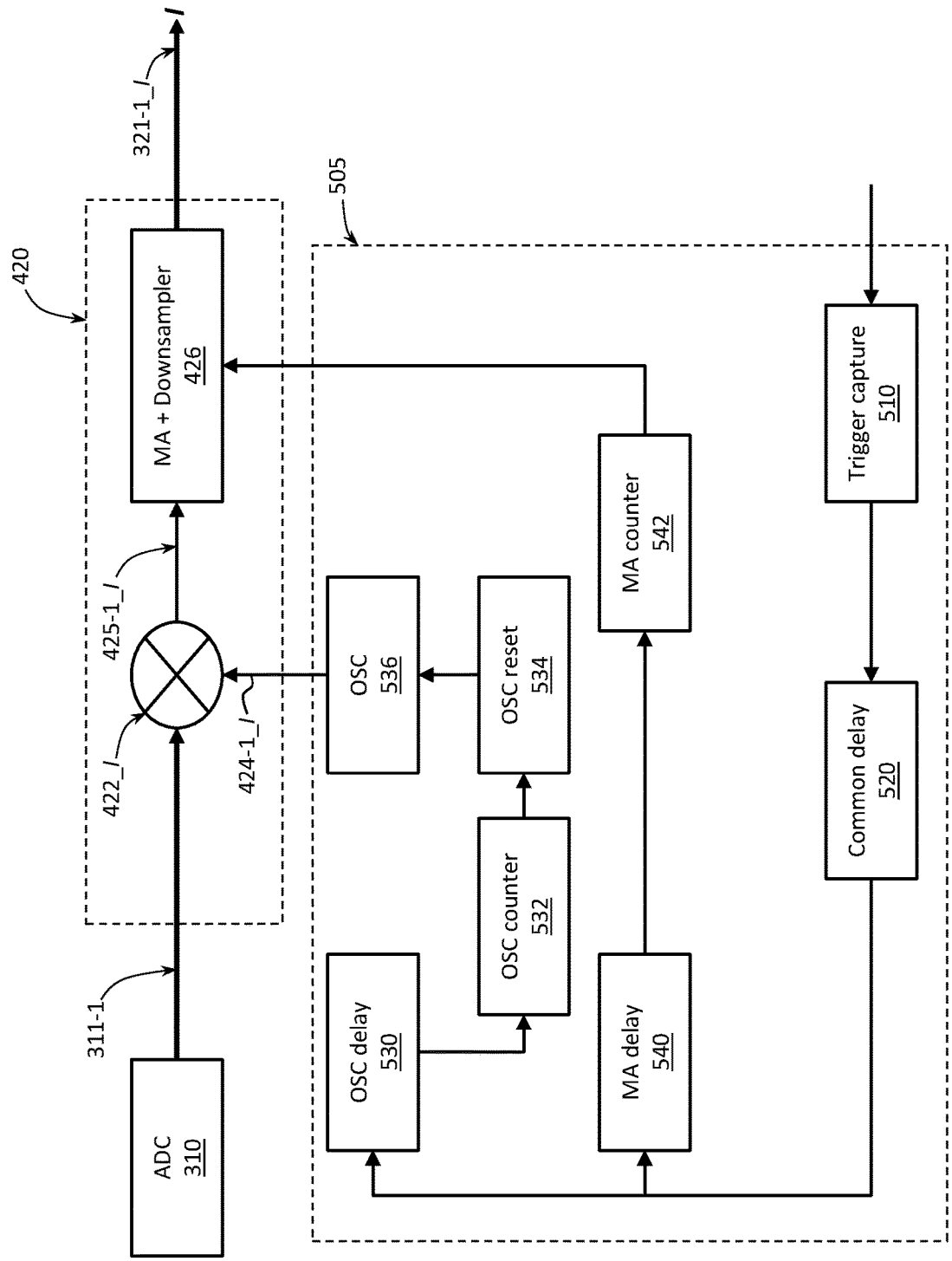
FIG. 5 provides a schematic illustration of a portion of a digital signal chain for either an I- or a Q-path of quadrature processing for one tone of one channel of the DSP unit associated with one of the ADCs of the SFCW system shown in FIG. 3, according to some embodiments of the present disclosure.

FIG. 5 provides a schematic illustration of a portion of a digital signal chain for either an I- or a Q-path of quadrature processing for one tone of one channel of the DSP unit associated with one of the ADCs of the SFCW system shown in FIG. 3, according to some embodiments of the present disclosure. In particular, FIG. 5 illustrates an example for a digital signal chain 420 for tone 1 of channel 1 (i.e., ADC 1 and DSP unit 1), but analogous descriptions are applicable to Q-path processing of this tone and channel, as well as to other tones and/or other channels of a SFCW system such as the SFCW system 300. As shown in FIG. 5, in some embodiments, the digital signal chain 420 may be associated with an assembly 505 that includes a trigger capture circuit 510, a common delay circuit 520, an oscillator (OSC) delay circuit 532, an oscillator counter 532, an oscillator reset circuit 534, an oscillator 536, a moving averager (MA) delay circuit 540, and a moving averager counter 542. In some embodiments, a different instance of the assembly 505 may be included for each instance of the I- or Q-path processing for all tones and channels of the SFCW system 300. In other embodiments, a single assembly 505, or at least portions of the assembly 505 may be shared among two or more digital signal chains 420 of the I- or Q-path processing of any of the tones and channels of the SFCW system 300. For example, in some embodiments, all components of the assembly 505 except for the oscillator 536 may be shared among the digital signal chain for the I-path and the digital signal chain for the Q-path for a given tone and a given channel, where the oscillators 536 may be different for the I- and Q-paths in that they output oscillator signals which are components that are out of phase by 90 degrees, as described above with reference to the in-phase component 424-1_I and the quadrature component 424-1_Q of the oscillator signal 424-1. In other embodiments, the oscillator 536 may be shared as well in that the oscillator 536 may be the oscillator configured to output the oscillator signal 424-1, with a respective further component (not specifically shown in the present drawings) being included between the oscillator 536 and the mixer 422 in each of the I- and the Q-paths to generate the in-phase component 424-1_I and the quadrature component 424-1_Q based on the oscillator signal 424-1.

The trigger capture circuit 510 may be configured to receive and/or identify a trigger indicative of a time when a burst was transmitted. The common delay circuit 520 may be configured to apply a delay between the time when the burst was transmitted and the time when the valid sample range 214 starts that is common to the oscillator 536 and the moving averager 426. The oscillator delay circuit 532 may be configured to apply a delay between the time when the burst was transmitted and the time when the valid sample range 214 starts that is specific to the oscillator 536 (i.e., the delay that does not apply to the moving averager 426). The MA delay circuit 540 may be configured to apply a delay between the time when the burst was transmitted and the time when the valid sample range 214 starts that is specific to the moving averager 426 (i.e., the delay that does not apply to the oscillator 536). The oscillator counter 532 may be configured to periodically generate the trigger, or sampling point, for the oscillator 536, indicating to the oscillator 536 when the valid sample range 214 starts for each of the bursts of a given SFCW signal. Similarly, the moving averager counter 542 may be configured to periodically generate the trigger, or sampling point, for the moving averager 426, indicating to the moving averager 426 when the valid sample range 214 starts for each of the bursts of a given SFCW signal. The oscillator reset circuit 534 is configured to reset the oscillator based on the trigger and the oscillator delay. The oscillator 536 is configured to generate an oscillator signal to be used by the mixer 422. Functionality of these components will now be described in greater detail with reference to FIGS. 6-8.

Figure 6:
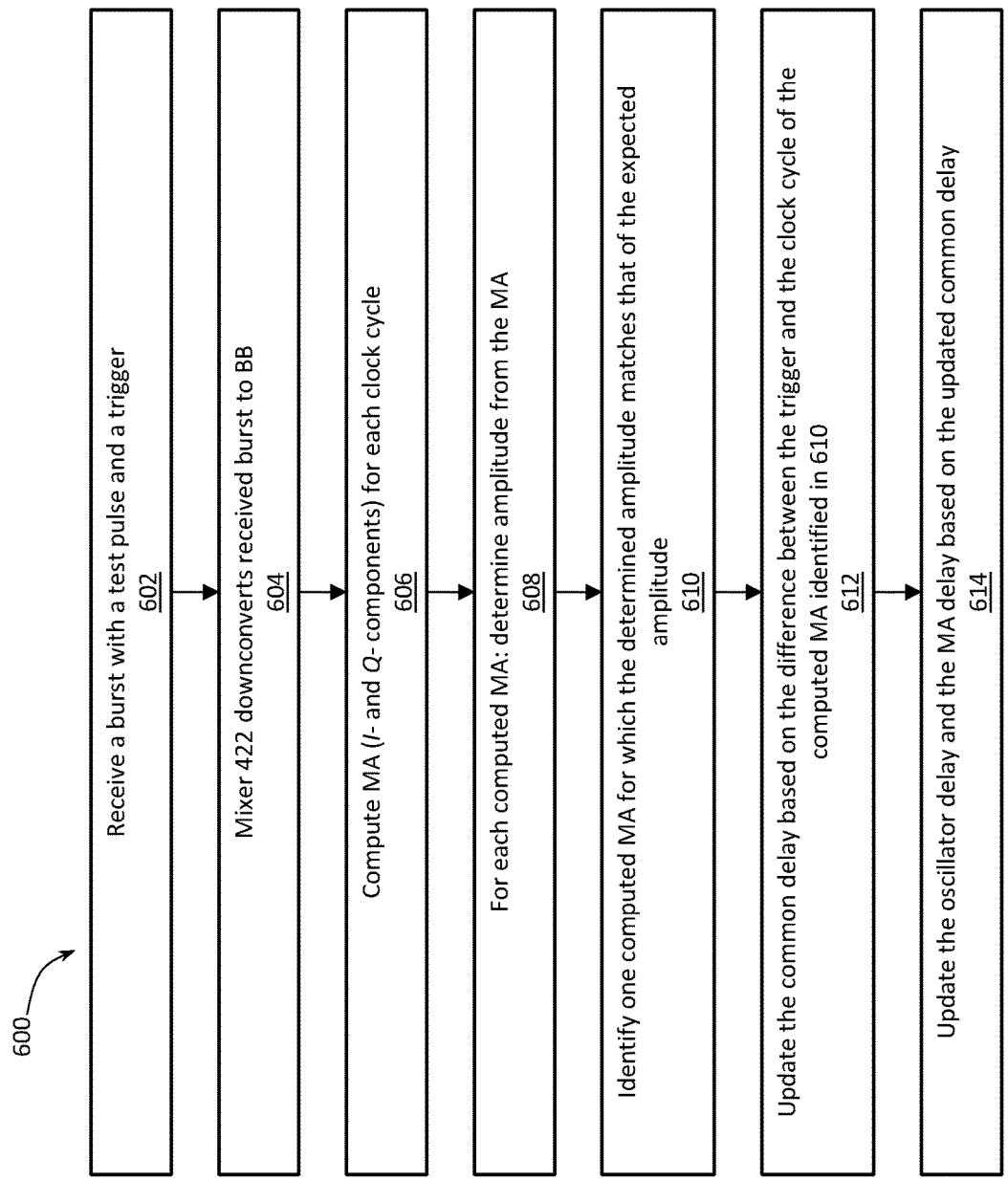
FIG. 6 provides an example method for calibrating the delays to be used in data capture in a SFCW system, according to some embodiments of the present disclosure.

FIG. 6 provides an example method 600 for calibrating the delays to be used in data capture in a SFCW system, according to some embodiments of the present disclosure. While the method 600 is described with reference to the SFCW system 300 and, in particular, with references to the digital signal chain 420 and the assembly 505 as shown in FIG. 5, in other embodiments, any other systems/components, configured to perform the steps of the method 600, in any suitable order, are within the scope of the present disclosure.

The method 600 may begin with step 602, in which the SFCW system 300 (e.g., the calibration circuit 330) receives a burst with a test pulse (i.e., a pulse with a test tone/frequency) and a trigger indicating when the burst was transmitted. The burst may have a time duration of L clock cycles. One or more of the ADCs 310 of the SFCW system 300 may generate a digital signal that includes a sequence of digital samples indicative of the received test pulse.

In step 604, the SFCW system 300 (e.g., one or more of the mixers 422) may be configured to downconvert the digital signal indicative of the received test pulse to a baseband signal, so that subsequently (in step 606) the moving averages are computed based on the baseband digital signal.

In step 606, the SFCW system 300 (e.g., one or more of the moving averagers 426) may be configured to compute a moving average of a subset of S consecutive digital samples of the digital signal (where S is an integer smaller than L) for each clock cycle for the time duration of L clock cycles. In some embodiments, computing the moving average for each clock cycle in step 606 may include computing an average of the S consecutive digital samples of the digital signal with the last digital sample being a digital sample of the clock cycle.

In some embodiments, the one or more moving averagers 426 may be configured to output the moving average values computed in step 606 for each clock cycle in a way so that the moving averages may be stored in a database, e.g., in a first-in-first-out (FIFO) storage. In this manner, the database may contain all average values computed for different subsets of S consecutive digital samples for the L clock cycles. When quadrature processing as described above is used, this means that 2*L moving average values will be computed (L moving average values for the I-components and L moving average values for the Q-components). These values may include moving average values computed using only invalid samples (including samples from previous digital signals which were provided to the moving averages before the digital signal indicative of the received test pulse was provided thereto), moving average values computed using valid as well as invalid samples, and moving average values computed using only valid samples. Because each moving average value is computed for a different clock cycle, each value corresponds to a particular delay value.

Figure 7:
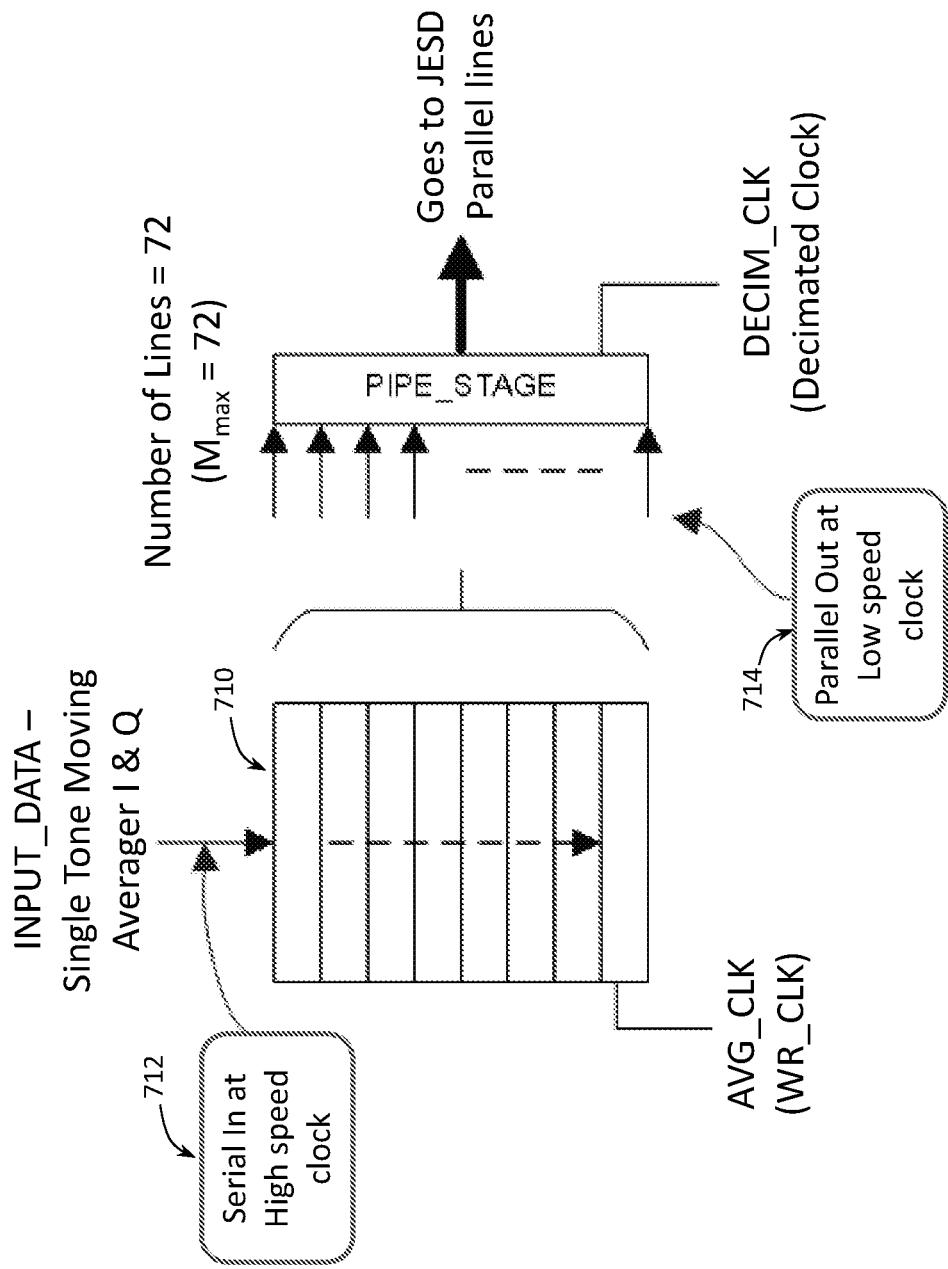
FIG. 7 provides a schematic illustration for the method of FIG. 6, according to some embodiments of the present disclosure.

In some embodiments, the moving average values computed in step 606 may be transferred from the DSP units 320 of the SFCW system 300 to the baseband circuit that may be coupled to (and may be a part of) the SFCW system 300. Because the SFCW system 300 includes multiple channels (e.g., N channels) and may be coupled to the baseband circuit with parallel communicative connections, in some embodiments, all or at least a subset of the moving average values computed in step 606 may be transferred from the DSP units 320 of the SFCW system 300 to the baseband circuit substantially in parallel. For example, consider that the burst with the test tone has a duration of 36 clock cycles (i.e., L=36), that the SFCW system 300 includes 16 channels (i.e., N=16), and that each channel is configured to process 3 tones (i.e., K=3). In such an example, the DSP units 320 of the SFCW system 300 may be coupled to the baseband circuit using 216 (216=36*2*3) parallel interfaces, out of which 72 (72=36*2) may be used to transfer 36 moving averages computed for the I-components of the received test pulse and 36 moving averages computed for the Q-components of the received test pulse. Such embodiments may advantageously allow transferring the data at a lower rate. An example of this is schematically illustrated in FIG. 7, showing an embodiment in which a FIFO database 710 may be configured to receive the moving average values computed in step 606. As shown in FIG. 7, the input to the FIFO database 710 may be provided over a serial input interface 712, operating at a relatively high-speed clock. For the example of the test burst having the duration of 36 clock cycles, the 72 moving average values accumulated in the FIFO database 710 may then be output (e.g., over the JESD interface to the baseband circuit) using a parallel output 714 that includes 72 parallel lines, operating at a relatively low-speed clock (because of the parallel data transfer).

In some embodiments, the moving average values computed in step 606 may be values which have not been downsampled by the moving averagers 426.

In some embodiments, the moving average values computed in step 606 may be tagged with the trigger for when the test pulse was transmitted. For example, each of the values computed in 606 may be associated with a flag, e.g., a bit value, where for one of the computed moving average values (e.g., for one I- and one Q-component values) the flag will indicate that this is the time when the test pulse was transmitted (based on the trigger received in step 602), e.g., for that moving average value the flag may be active, while for all other moving average values the flag may be inactive.

The method 600 may then proceed with step 608 that includes the SFCW system 300 (e.g., the baseband circuit and/or the calibration circuit 330) determining an amplitude (and, optionally, a phase) for each computed moving average. Because this is a test pulse, a certain amplitude (and, optionally, a phase) is expected for one or more moving averages that were computed using valid data samples. Therefore, in step 610, the method 600 may include the SFCW system 300 (e.g., the baseband circuit and/or the calibration circuit 330) identifying one (or more) of the computed moving averages for which the determined amplitude (and, optionally, a phase) is closest to an expected amplitude (and, optionally, an expected phase) by comparing the amplitude/phase values computed in step 608 with the expected amplitude/phase value(s).

The method 600 may then proceed with the SFCW system 300 (e.g., the baseband circuit and/or the calibration circuit 330) identifying a clock cycle of the moving average identified in step 610. The method 600 may then proceed the SFCW system 300 (e.g., the baseband circuit and/or the calibration circuit 330) updating at least one delay to be applied in digital signal processing of received bursts based on a difference between the trigger received in step 602 and the clock cycle of the moving average identified in step 610. As shown in FIG. 6, updating at least one delay in this manner may include step 612 that includes the SFCW system 300 (e.g., the baseband circuit and/or the calibration circuit 330) updating a common delay to be applied by the common delay circuit 520 based on a difference between the trigger received in step 602 and the clock cycle of the moving average identified in step 610, and further include step 614 that includes the SFCW system 300 (e.g., the baseband circuit and/or the calibration circuit 330) updating an oscillator delay to be applied by the oscillator delay circuit 530 and/or updating a moving averager delay to be applied by the moving averager delay circuit 540 (both updates performed based on a difference between the trigger received in step 602 and the clock cycle of the moving average identified in step 610).

In some embodiments, the method 600 may be repeated for multiple test pulses, e.g., for different test tones (e.g., for different frequencies), and/or test tones transmitted using different transmitters of the SFCW system 300.

Figure 8:
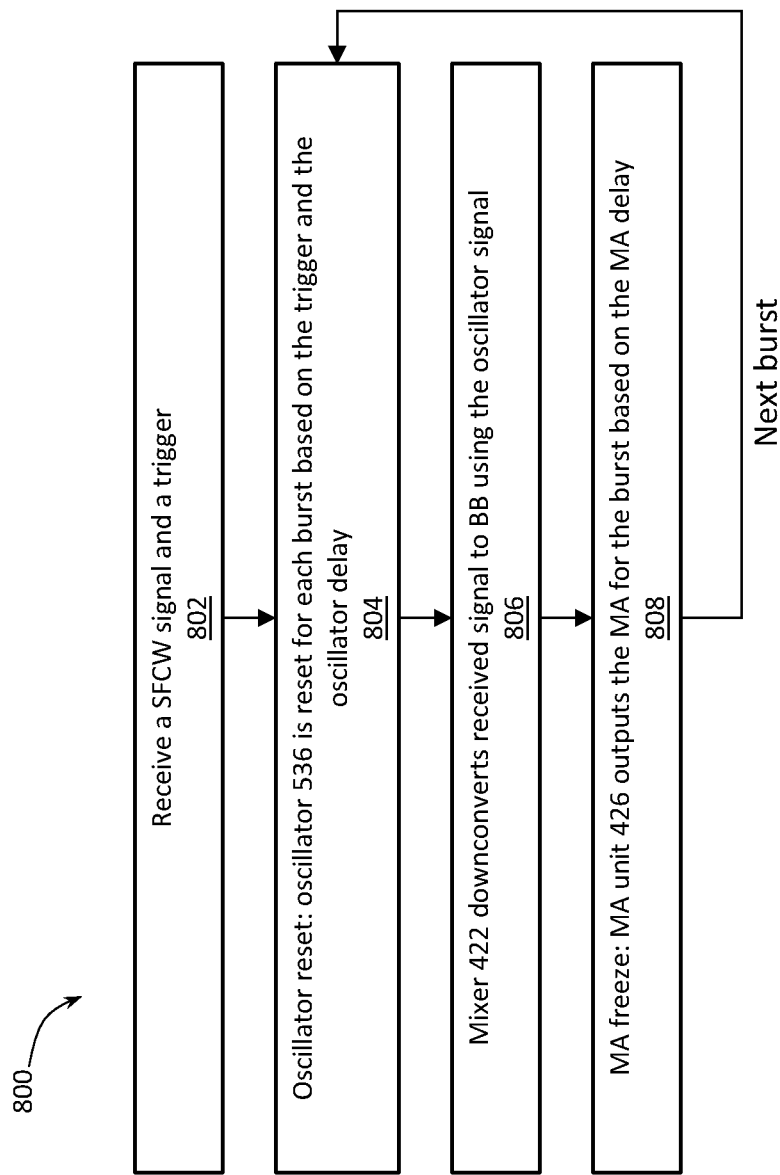
FIG. 8 provides an example method for using the delays determined using the method of FIG. 6 for data capture in a SFCW system, according to some embodiments of the present disclosure.

FIG. 8 provides an example method 800 for operating a SFCW system, e.g., the SFCW system 300, using the delays determined using the method 600 of FIG. 6, according to some embodiments of the present disclosure. While the method 800 is described with reference to the SFCW system 300 and, in particular, with references to the digital signal chain 420 and the assembly 505 as shown in FIG. 5, in other embodiments, any other systems/components, configured to perform the steps of the method 800, in any suitable order, are within the scope of the present disclosure.

The method 800 may begin with step 802 that includes the SFCW system 300 receiving a SFCW signal comprising a plurality of consecutive bursts, each burst comprising a pulse of a different frequency (e.g., receiving a signal similar to the signal 100, described above). Step 802 may also include the SFCW system 300 receiving a trigger indicative of a time when the received SFCW signal was transmitted. The trigger may be received/identified in step 802 using the trigger capture circuit 510, and may identify the time when the first burst (or any of the bursts) of the received SFCW signal was transmitted. The trigger capture circuit 510 may pass the received trigger to the common delay circuit 520 that may apply the common delay to the transmission time identified by the trigger (the common delay established using, e.g., the method 600, described above). Subsequently, the output of the common delay circuit 520 may be processed by each of the oscillator delay circuit 530 and the moving averager delay circuit 540. The oscillator delay circuit 530 may be configured to apply the oscillator delay (the oscillator delay established using, e.g., the method 600, described above) to the transmission time identified by the trigger and modified by the common delay.

Based on the output of the oscillator delay circuit 530, the oscillator counter circuit 532 is able to periodically generate a trigger for the oscillator reset circuit 534 and the oscillator circuit 536 so that the oscillator reset circuit 534 may reset the oscillator 536, in step 804 of the method 800, before every new valid sample region 214 starts for different bursts of the received SFCW signal. Thus, step 804 may include, in general, resetting the oscillator 536 based on the trigger received in step 802 and further based on the oscillator delay (which is based on the common delay). In some embodiments, step 804 may include resetting the oscillator 536 based on the trigger received in step 802 only for the first burst of the received SFCW signal, thus creating an alignment between the time the signal was transmitted and when the valid sample range 214 for the first burst starts, but then resetting the oscillator 536 for the subsequent bursts of the received SFCW signal based on the oscillator counter circuit 532 generating a trigger to reset the oscillator 536 (thus, the oscillator counter circuit 532 may periodically generate a trigger to reset the oscillator 536 from the alignment point established for the first burst). In such embodiments, resetting the oscillator 536 based on the trigger received in step 802 and further based on the oscillator delay applied by the oscillator delay circuit 530 may include starting the oscillator counter 532 based on the trigger received in step 802 and the oscillator delay applied by the oscillator delay circuit 530, and resetting the oscillator 536 for each burst of the received SFCW signal based on the count of the oscillator counter 532. For example, when each of the plurality of consecutive bursts of the received SFCW signal has a time duration of L clock cycles, and the oscillator counter 532 may be configured to count clock cycles since the transmission time identified by the trigger received in step 802 and the oscillator delay applied by the oscillator delay circuit 530 to identify when a new burst of the plurality of consecutive bursts begins.

The method 800 may also include step 806 that includes the SFCW system 300 generating a downconverted signal by performing a frequency downconversion of a digital signal that includes a sequence of digital samples indicative of the burst using an oscillator signal generated by the oscillator after the oscillator has been reset in step 806. Thus, each of the mixers 422 included in the SFCW system 300 may be configured to perform frequency conversion of the respective input signal 311 received from the corresponding ADC 310 (e.g., the input signal 311-1 for the example shown in FIG. 5) and the respective oscillator signal 424 received from the oscillator 536 (e.g., the I-component 424-1_I for the example shown in FIG. 5), the latter generated after the oscillator 536 is reset before the beginning of the valid sample region 214 for each new burst of the received signal. Resetting the oscillator 536 at the start of each new valid sample region 214 allows knowing the phase of the downconverted output signal 425 deterministically. This may advantageously allow eliminating the need for adjusting the phase of the output 425 based on the phase of the oscillator 536, a process that may become tedious and complicate signal processing. For example, consider that the input signal 311 provided to a given mixer 422 may be represented as $A \cdot \cos(w_c t + \Phi)$, where A is the amplitude and $\phi$ is the phase of the input signal 311. The oscillator signal 424 provided to that mixer 422 may be, in general, represented as $e^{-j(w_c t + \varphi)}$, where $\varphi$ is the phase of the oscillator signal 424. The resulting phase of the output 425 of the mixing by the mixer 422 will be $\Phi - \varphi$. Resetting the oscillator 536 at the beginning of each valid window results in aligning the oscillator signal 424 with beginning of valid window 214 so that the oscillator signal 424 becomes $e^{-j(w_c t)}$ and the phase of the output 425 becomes $\Phi$.

The method 800 may further include step 808 in which the moving averager 426 is configured to compute and output the moving average value based on the moving averager delay applied by the moving average delay circuit 540 (which delay is based on the common delay). Step 808 may be referred to as a "freeze" of the moving averager 426 in that it may include selecting a subset of S consecutive digital samples of the downconverted digital signal based on the trigger received in step 802 and further based on the moving averager delay applied by the moving average delay circuit 540, and using the moving averager 426 to compute a moving average for the selected subset of S consecutive digital samples. In some embodiments, step 808 may include selecting a subset of S consecutive digital samples to be used for computing a moving average based on the trigger received in step 802 only for the first burst of the received SFCW signal, thus creating an alignment between the time the signal was transmitted and when the valid sample range 214 for the first burst starts. After that, selecting subsets of S consecutive digital samples for computing moving averages for the subsequent bursts of the received SFCW signal may be done based on the moving averager counter circuit 542 generating a trigger that indicates beginning of each new valid sample region 214 (thus, the moving averager counter circuit 542 may periodically generate a trigger to indicate to the moving averager 426 the beginning of the valid samples to be used for moving average computations for each burst). In such embodiments, selecting the subset of S consecutive digital samples of the downconverted digital signal based on the trigger received in step 802 and further based on the moving averager delay applied by the moving averager delay circuit 540 may include starting the moving averager counter 542 based on the trigger received in step 802 and further based on the moving averager delay applied by the moving averager delay circuit 540, and selecting the subset of S consecutive digital samples based on the count of the moving averager counter 542. For example, when each of the plurality of consecutive bursts of the received SFCW signal has a time duration of L clock cycles, and the moving averager counter 542 may be configured to count clock cycles since a time identified by the trigger received in step 802 and the moving averager delay applied by the moving averager delay circuit 540 to identify when the subset of S consecutive digital samples of a new burst of the plurality of consecutive bursts begins.

Although not specifically shown in FIG. 8, in some embodiments, the method 800 may further include providing the computed moving average values to a baseband circuit coupled to the SFCW system 300 for determining one or more of an amplitude and a phase for each of the bursts. This process may be repeated for multiple bursts with counter periodically triggering the capture pulses based on initial alignment with external trigger (in other words, steps 804, 806, and 808 may be repeated for each of the bursts of the received signal).

To summarize some aspects of the functionality of the SFCW system 300, described above, the SFCW system 300 may be configured to receive a SFCW signal comprising K bursts, where K is an integer greater than 1 and where each burst includes a pulse of a different frequency. In some embodiments, these bursts may be parallel bursts (for example, the bursts may be transmitted in parallel by transmitters and the signals co-exist in the spectrum, then the 2K downconverting mixers 422 will get their targeted signals to baseband). The SFCW system 300 may include N channels, where each channel includes an ADC 310, 2K downconverting mixers 422, and 2K moving averagers 426. Each of the 2K downconverting mixers 422 of a given channel may be configured to receive a signal indicative of an output of the ADC 310 of the channel (i.e., all of the 2K downconverting mixers 422 may be configured to receive the same input). Each of the 2K moving averagers of a given channel may be configured to receive a signal indicative of an output of a different one of the 2K d downconverting mixers 422 of that channel (i.e., there is a one-to-one correspondence in that each one of the 2K moving averagers corresponds to only one of the 2K downconverters and vice versa). The SFCW system 300 may further include a calibration circuit 330, configured to enable the ADC 310 to receive a signal indicative of a burst with a test pulse, the burst having a time duration of L clock cycles, and to generate a digital signal that includes a sequence of digital samples indicative of the burst. The calibration circuit 330 may be further configured to enable one of the 2K downconverting mixers 422 to generate a downconverted digital signal by performing a frequency downconversion of the digital signal generated by the ADC 310. Further, the calibration circuit 330 may be configured to receive a trigger indicative of a time when one of the bursts (e.g., the first burst) was transmitted, enable one or more of the 2K moving averagers 426 to compute a moving average of a subset of S consecutive digital samples of the downconverted digital signal (where S is smaller than L) for each clock cycle for the time duration of L clock cycles. The calibration circuit 330 may also be configured to determine an amplitude (and, optionally, a phase) for each computed moving average, identify one of the computed moving averages for which the determined amplitude (and, optionally, a phase) is closest to an expected amplitude (and, optionally, an expected phase), identify a clock cycle of the identified moving average, and update at least one delay to be applied in digital signal processing of received bursts based on a difference between the trigger and the identified clock cycle, as described with reference to FIG. 6.

Example Data Processing System

Figure 9:
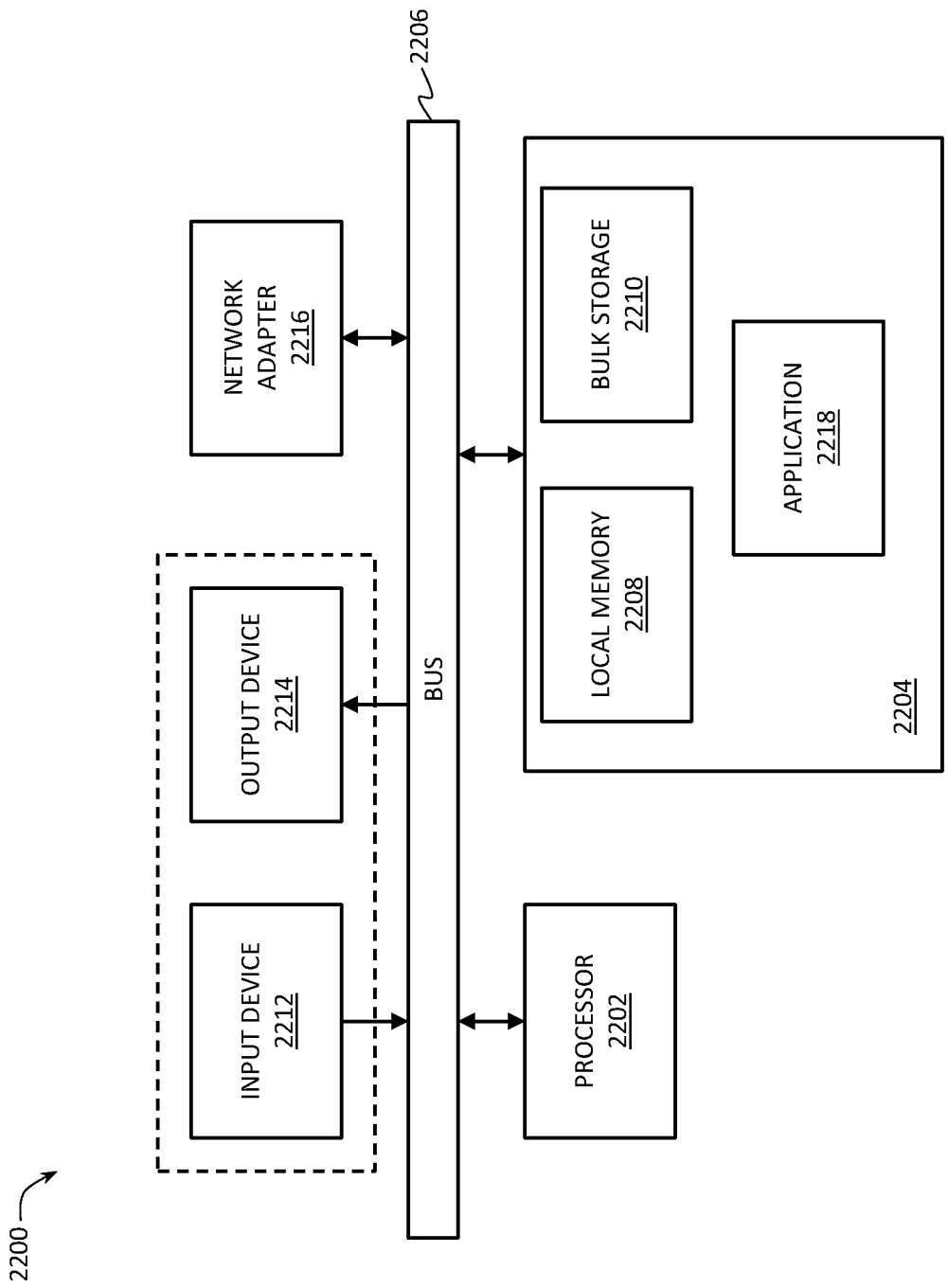
FIG. 9 provides a block diagram illustrating an example data processing system that may be configured to control implementation of at least parts of delay calibration for a SFCW digital signal chain as described herein, according to some embodiments of the present disclosure.

FIG. 9 provides a block diagram illustrating an example data processing system 2200 that may be configured to control implementation of at least parts of delay calibration for a SFCW digital signal chain as described herein, according to some embodiments of the present disclosure. For example, the data processing system 2200 may be configured to implement or control portions of any embodiments of the SFCW 300, described herein. For example, the data processing system 2200 may be configured to implement at least portions of the calibration circuit 330.

As shown in FIG. 9, the data processing system 2200 may include at least one processor 2202, e.g. a hardware processor 2202, coupled to memory elements 2204 through a system bus 2206. As such, the data processing system may store program code within memory elements 2204. Further, the processor 2202 may execute the program code accessed from the memory elements 2204 via a system bus 2206. In one aspect, the data processing system may be implemented as a computer that is suitable for storing and/or executing program code. It should be appreciated, however, that the data processing system 2200 may be implemented in the form of any system including a processor and a memory that is capable of performing the functions described within this disclosure.

In some embodiments, the processor 2202 can execute software or an algorithm to perform the activities as discussed in the present disclosure, in particular activities related to delay calibration for a SFCW digital signal chain, as described herein. The processor 2202 may include any combination of hardware, software, or firmware providing programmable logic, including by way of non-limiting example a microprocessor, a digital signal processor (DSP), a field-programmable gate array (FPGA), a programmable logic array (PLA), an application specific IC (ASIC), or a virtual machine processor. The processor 2202 may be communicatively coupled to the memory element 2204, for example in a direct-memory access (DMA) configuration, so that the processor 2202 may read from or write to the memory elements 2204.

In general, the memory elements 2204 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 2200 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any elements of the SFCW 300 shown in the present drawings, can also include suitable interfaces for receiving, transmitting, and/or otherwise communicating data or information in a network environment so that they can communicate with, e.g., the data processing system 2200.

In certain example implementations, mechanisms for implementing delay calibration for a SFCW digital signal chain as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 2204 shown in FIG. 9, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 2202 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 2204 may include one or more physical memory devices such as, for example, local memory 2208 and one or more bulk storage devices 2210. The local memory may refer to RAM or other non-persistent memory device(s) generally used during actual execution of the program code. A bulk storage device may be implemented as a hard drive or other persistent data storage device. The processing system 2200 may also include one or more cache memories (not shown) that provide temporary storage of at least some program code in order to reduce the number of times program code must be retrieved from the bulk storage device 2210 during execution.

As shown in FIG. 9, the memory elements 2204 may store an application 2218. In various embodiments, the application 2218 may be stored in the local memory 2208, the one or more bulk storage devices 2210, or apart from the local memory and the bulk storage devices. It should be appreciated that the data processing system 2200 may further execute an operating system (not shown in FIG. 9) that can facilitate execution of the application 2218. The application 2218, being implemented in the form of executable program code, can be executed by the data processing system 2200, e.g., by the processor 2202. Responsive to executing the application, the data processing system 2200 may be configured to perform one or more operations or method steps described herein.

Input/output (I/O) devices depicted as an input device 2212 and an output device 2214, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 2214 may be any type of screen display, such as plasma display, liquid crystal display (LCD), organic light emitting diode (OLED) display, electroluminescent (EL) display, or any other indicator, such as a dial, barometer, or LEDs. In some implementations, the system may include a driver (not shown) for the output device 2214. Input and/or output devices 2212, 2214 may be coupled to the data processing system either directly or through intervening I/O controllers.

In an embodiment, the input and the output devices may be implemented as a combined input/output device (illustrated in FIG. 9 with a dashed line surrounding the input device 2212 and the output device 2214). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 2216 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 2200, and a data transmitter for transmitting data from the data processing system 2200 to said systems, devices and/or networks. Modems, cable modems, and Ethernet cards are examples of different types of network adapter that may be used with the data processing system 2200.

Select Examples

The following paragraphs provide various examples of the embodiments disclosed herein.

Example 1 provides a method for calibrating a SFCW system, the method including: receiving a burst with a test pulse, the burst having a time duration of L clock cycles; receiving a trigger indicative of a time when the burst was transmitted; generating a digital signal that includes a sequence of digital samples indicative of the received burst; for each clock cycle for the time duration of L clock cycles, computing a moving average of a subset of S consecutive digital samples of the digital signal (where S is smaller than L); for each computed moving average, determining an amplitude (and, optionally, a phase); identifying one of the computed moving averages for which the determined amplitude (and, optionally, a phase) is closest to an expected amplitude (and, optionally, an expected phase); identifying a clock cycle of the identified moving average; and updating at least one delay to be applied in digital signal processing of received bursts based on a difference between the trigger and the identified clock cycle.

Example 2 provides the method according to example 1, where the digital signal from which the moving averages are computed is a baseband signal.

Example 3 provides the method according to examples 1 or 2, where computing the moving average for each clock cycle includes computing an average of the S consecutive digital samples of the digital signal with the last digital sample being a digital sample of the clock cycle.

Example 4 provides the method according to any one of the preceding examples, where computing the moving average for each clock cycle includes computing an I-component and a Q-component of the moving average for each clock cycle.

Example 5 provides the method according to example 4, further including storing the I-component and the Q-component of the moving average for each clock cycle in a database.

Example 6 provides the method according to example 5, further including transmitting the I-components and the Q-components of the moving averages for all clock cycles in parallel to a baseband circuit.

Example 7 provides the method according to any one of the preceding examples, where updating the at least one delay includes updating a delay for a moving averager configured to compute the moving average.

Example 8 provides the method according to any one of the preceding examples, where generating the digital signal includes performing a frequency downconversion of the received burst from a radio frequency (RF) or an intermediate frequency (IF) to a baseband (BB), i.e., to substantially DC or zero frequency.

Example 9 provides the method according to example 8, where the frequency downconversion is performed using a signal generated by an oscillator, and where updating the at least one delay includes updating a delay for the oscillator.

Example 10 provides the method according to example 9, where updating the at least one delay includes updating a common delay for a moving averager configured to compute the moving average and for the oscillator.

Example 11 provides the method according to any one of the preceding examples, where the test pulse is a first test pulse, and the method further includes repeating steps of receiving the burst, receiving the trigger, generating the digital signal, computing the moving average, determining the amplitude, identifying the one of the computer moving averages, identifying the clock cycle, and updating the at least one delay for a second test pulse.

Example 12 provides the method according to example 11, where the first test pulse and the second test pulse have different frequencies.

Example 13 provides the method according to examples 11 or 12, where the first test pulse and the second test pulse are transmitted by different transmitters.

Example 14 provides the method according to any one of the preceding examples, further including determining a phase for each computed moving average, where identifying the one of the computed moving averages for which the determined amplitude is closest to the expected amplitude further includes identifying the one of the computed moving averages for which the determined phase is closest to an expected phase.

Example 15 provides a method for operating a SFCW system, the method including: receiving a SFCW signal including a plurality of consecutive bursts, each burst including a pulse of a different frequency; receiving a trigger indicative of a time when the received SFCW signal was transmitted; for each burst of the received SFCW signal: resetting an oscillator based on the received trigger and further based on an oscillator delay, generating a downconverted signal by performing a frequency downconversion of a digital signal that includes a sequence of digital samples indicative of the burst using an oscillator signal generated by the oscillator after the oscillator has been reset, selecting a subset of S consecutive digital samples of the downconverted digital signal based on the trigger and a moving averager delay, using the moving averager to compute a moving average for the selected subset of S consecutive digital samples, and providing the computed moving average to a baseband circuit for determining one or more of an amplitude and a phase for the burst. This process is repeated for multiple bursts with counter periodically triggering the capture pulses based on initial alignment with external trigger.

Example 16 provides the method according to example 15, where resetting the oscillator based on the received trigger and further based on the oscillator delay includes starting an oscillator counter based on the received trigger and the oscillator delay, and resetting the oscillator for each burst of the received SFCW signal based on the oscillator counter.

Example 17 provides the method according to example 16, where each of the plurality of consecutive bursts has a time duration of L clock cycles, and the oscillator counter is configured to count clock cycles since a time identified by the received trigger and the oscillator delay to identify when a new burst of the plurality of consecutive bursts begins.

Example 18 provides the method according to any one of examples 15-17, where selecting the subset of S consecutive digital samples of the downconverted digital signal based on the trigger and the moving averager delay for each burst of the received SFCW signal includes starting a moving averager counter based on the received trigger and the moving averager delay, and selecting the subset of S consecutive digital samples based on the moving averager counter.

Example 19 provides the method according to example 18, where each of the plurality of consecutive bursts has a time duration of L clock cycles, and the moving averager counter is configured to count clock cycles since a time identified by the received trigger and the moving averager delay to identify when the subset of S consecutive digital samples of a new burst of the plurality of consecutive bursts begins.

Example 20 provides a SFCW system configured to receive a SFCW signal including K bursts, where K is an integer greater than 1 and where each burst includes a pulse of a different frequency (these bursts may be non-consecutive bursts, e.g., parallel or at least partially overlapping in time bursts; e.g., the bursts may be transmitted in parallel by transmitters and the signals co-exist in the spectrum, then those 2K down-converters will get their targeted signals to DC). The system includes a channel, having: an ADC; 2K downconverting mixers (or, simply, downconverters), each configured to receive a signal indicative of an output of the ADC (i.e., all of the 2K downconverters are configured to receive the same input); 2K moving averagers, each configured to receive a signal indicative of an output of a different one of the 2K downconverters (i.e., there is a one-to-one correspondence in that each one of the 2K moving averagers corresponds to only one of the 2K downconverters and vice versa). The system further includes a calibration circuit, configured to enable the ADC to receive a signal indicative of a burst with a test pulse, the burst having a time duration of L clock cycles, and to generate a digital signal that includes a sequence of digital samples indicative of the burst, enable one of the 2K downconverters to generate a downconverted digital signal by performing a frequency downconversion of the digital signal generated by the ADC, receive a trigger indicative of a time when the burst was transmitted, enable one or more of the 2K moving averagers to compute a moving average of a subset of S consecutive digital samples of the downconverted digital signal (where S is smaller than L) for each clock cycle for the time duration of L clock cycles, determine an amplitude (and, optionally, a phase) for each computed moving average, identify one of the computed moving averages for which the determined amplitude (and, optionally, a phase) is closest to an expected amplitude (and, optionally, an expected phase), identify a clock cycle of the identified moving average, and update at least one delay to be applied in digital signal processing of received bursts based on a difference between the trigger and the identified clock cycle.

Example 21 provides the system according to example 20, where the channel is one of N channels of the system, the system further includes interfaces for parallel transmission of data from each of the 2K moving averagers of each of the N channels to a baseband circuit, computing the moving average for each clock cycle for the time duration of L clock cycles includes computing an I-component and a Q-component of the moving average for each clock cycle, and the calibration circuit is further configured to use at least a subset of the interfaces for parallel transmission of the I-components and the Q-components of the moving averages for the L clock cycles (i.e., L moving average values for the I-components and L moving average values for the Q-components) to a baseband circuit.

Example 22 provides a non-transitory computer-readable storage medium including instructions for execution which, when executed by a processor, are operable to perform operations of the method according to any one of examples 1-18 and/or to control operation of the system according to any one of examples 20-21.

Variations and Implementations

While embodiments of the present disclosure were described above with references to exemplary implementations as shown in FIGS. 1-9, a person skilled in the art will realize that the various teachings described above are applicable to a large variety of other implementations.

In the discussions of the embodiments above, components of a system, such as e.g. counters, delay elements, and/or other components can readily be replaced, substituted, or otherwise modified in order to accommodate particular circuitry needs. Moreover, it should be noted that the use of complementary electronic devices, hardware, software, etc. offer an equally viable option for implementing the teachings of the present disclosure related to implementing delay calibration for a SFCW digital signal chain.

Parts of various systems for implementing delay calibration for a SFCW digital signal chain as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In some embodiments, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In some embodiments, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

All of the specifications, dimensions, and relationships outlined herein (e.g., the number of components of the SFCW systems, or portions thereof, shown in the present drawings, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the present drawings may be combined in various possible configurations, all of which are clearly within the broad scope of the present disclosure. In certain cases, it may be easier to describe one or more of the functionalities of a given set of flows by only referencing a limited number of electrical elements. It should be appreciated that the electrical circuits of the present figures and its teachings are readily scalable and can accommodate a large number of components, as well as more complicated or sophisticated arrangements and configurations. Accordingly, the examples provided should not limit the scope or inhibit the broad teachings of the electrical circuits as potentially applied to a myriad of other architectures.

Furthermore, functions related to implementing delay calibration for a SFCW digital signal chain as proposed herein illustrate only some of the possible functions that may be executed by, or within, system illustrated in the present figures. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Note that all optional features of the apparatus described above may also be implemented with respect to the method or process described herein and specifics in the examples may be used anywhere in one or more embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

The invention claimed is:

1. A method for calibrating a stepped frequency continuous wave (SFCW) system, the method comprising:
   receiving a burst with a test pulse, the burst having a time duration of L clock cycles, wherein L is an integer;
   receiving a trigger indicative of a time when the burst was transmitted;
   generating a digital signal that includes a sequence of digital samples indicative of the received burst;
   for each clock cycle for the time duration of L clock cycles, computing a moving average of a subset of S consecutive digital samples of the digital signal;
   for each computed moving average, determining an amplitude;
   identifying one of the computed moving averages for which the determined amplitude is closest to an expected amplitude;
   identifying a clock cycle of the identified moving average; and
   updating at least one delay to be applied in digital signal processing of received bursts based on a difference between the trigger and the identified clock cycle.

2. The method according to claim 1, wherein the digital signal is a baseband signal.

3. The method according to claim 1, wherein computing the moving average for each clock cycle includes computing an average of the S consecutive digital samples of the digital signal with the last digital sample being a digital sample of the clock cycle.

4. The method according to claim 1, wherein computing the moving average for each clock cycle includes computing an I-component and a Q-component of the moving average for each clock cycle.

5. The method according to claim 4, further comprising storing the I-component and the Q-component of the moving average for each clock cycle in a database.

6. The method according to claim 5, further comprising transmitting the I-components and the Q-components of the moving averages for all clock cycles in parallel to a baseband circuit.

7. The method according to claim 1, wherein updating the at least one delay includes updating a delay for a moving averager configured to compute the moving average.

8. The method according to claim 1, wherein generating the digital signal includes performing a frequency downconversion of the received burst from a radio frequency (RF) or an intermediate frequency (IF) to a baseband (BB).

9. The method according to claim 8, wherein the frequency downconversion is performed using a signal generated by an oscillator, and wherein updating the at least one delay includes updating a delay for the oscillator.

10. The method according to claim 9, wherein updating the at least one delay includes updating a common delay for a moving averager configured to compute the moving average and for the oscillator.

11. The method according to claim 1, wherein the test pulse is a first test pulse, and the method further includes repeating steps of receiving the burst, receiving the trigger, generating the digital signal, computing the moving average, determining the amplitude, identifying the one of the computer moving averages, identifying the clock cycle, and updating the at least one delay for a second test pulse.

12. The method according to claim 11, wherein the first test pulse and the second test pulse have different frequencies.

13. The method according to claim 11, wherein the first test pulse and the second test pulse are transmitted by different transmitters.

14. The method according to claim 1, further comprising determining a phase for each computed moving average, wherein identifying the one of the computed moving averages for which the determined amplitude is closest to the expected amplitude further includes identifying the one of the computed moving averages for which the determined phase is closest to an expected phase.

15. A method for operating a stepped frequency continuous wave (SFCW) system, the method comprising:
   receiving a SFCW signal comprising a plurality of consecutive bursts, each burst comprising a pulse of a different frequency;
   receiving a trigger indicative of a time when the SFCW signal was transmitted;
   for each burst of the SFCW signal:
   resetting an oscillator based on the received trigger and further based on an oscillator delay, generating a downconverted signal by performing a frequency downconversion of a digital signal that includes a sequence of digital samples indicative of the burst using an oscillator signal generated by the oscillator after the oscillator has been reset, selecting a subset of S consecutive digital samples of the downconverted digital signal based on the trigger and a moving averager delay, using the moving averager to compute a moving average for the selected subset of S consecutive digital samples, and providing the computed moving average to a baseband circuit for determining one or more of an amplitude and a phase for the burst.

16. The method according to claim 15, wherein resetting the oscillator based on the received trigger and further based on the oscillator delay includes:

starting an oscillator counter based on the received trigger and the oscillator delay, and resetting the oscillator for each burst of the SFCW signal based on the oscillator counter.

17. The method according to claim 16, wherein each of the plurality of consecutive bursts has a time duration of L clock cycles, wherein L is an integer, and the oscillator counter is configured to count clock cycles since a time identified by the received trigger and the oscillator delay to identify when a new burst of the plurality of consecutive bursts begins.

18. The method according to claim 15, wherein selecting the subset of S consecutive digital samples of the downconverted digital signal based on the trigger and the moving averager delay for each burst of the SFCW signal includes:

starting a moving averager counter based on the received trigger and the moving averager delay, and selecting the subset of S consecutive digital samples based on the moving averager counter.

19. The method according to claim 18, wherein each of the plurality of consecutive bursts has a time duration of L clock cycles, wherein L is an integer, and the moving averager counter is configured to count clock cycles since a time identified by the received trigger and the moving averager delay to identify when the subset of S consecutive digital samples of a new burst of the plurality of consecutive bursts begins.

20. A stepped frequency continuous wave (SFCW) system configured to receive a SFCW signal comprising K bursts, where K is an integer greater than 1 and where each burst includes a pulse of a different frequency, the system comprising a channel that includes:

an analog-to-digital converter (ADC);

2K downconverters, each configured to receive a signal indicative of an output of the ADC;

2K moving averagers, each configured to receive a signal indicative of an output of a different one of the 2K downconverters; and a calibration circuit, configured to:

enable the ADC to receive a signal indicative of a burst with a test pulse, the burst having a time duration of L clock cycles, wherein L is an integer, and to generate a digital signal that includes a sequence of digital samples indicative of the burst, enable one of the 2K downconverters to generate a downconverted digital signal by performing a frequency downconversion of the digital signal generated by the ADC, receive a trigger indicative of a time when the burst was transmitted, enable one or more of the 2K moving averagers to compute a moving average of a subset of S consecutive digital samples of the downconverted digital signal for each clock cycle for the time duration of L clock cycles, determine an amplitude for each computed moving average, identify one of the computed moving averages for which the determined amplitude is closest to an expected amplitude, identify a clock cycle of the identified moving average, and update at least one delay to be applied in digital signal processing of received bursts based on a difference between the trigger and the identified clock cycle.

* * * * *